Aug. 23, 1966  J. L. STOHLER  3,267,765
BRAKE DEVICE
Filed June 3, 1964
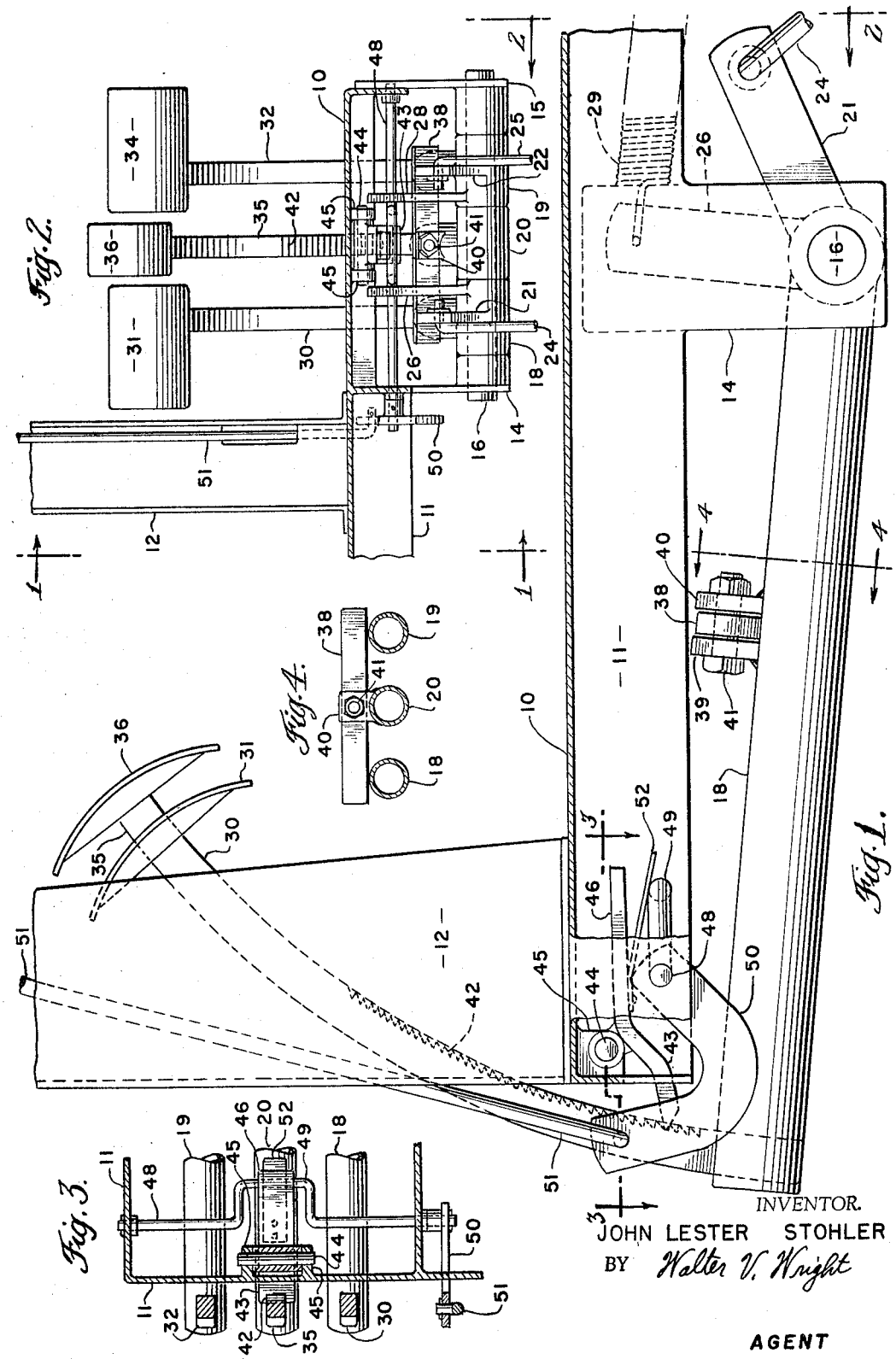
INVENTOR.
JOHN LESTER STOHLER
BY *Walter V. Wright*
AGENT

3,267,765
BRAKE DEVICE

John Lester Stohler, Ephrata, Pa., assignor to Sperry Rand Corporation, New Holland, Pa., a corporation of Delaware
Filed June 3, 1964, Ser. No. 372,164
2 Claims. (Cl. 74—480)

This invention relates to braking devices for vehicles of the type which employ independently controlled right side and left side wheel brakes.

Many vehicles which require a high degree of maneuverability, such as self-propelled farm machines, for example, employ independently controlled right side and left side brakes. With such a braking system, a vehicle may be pivoted about one locked wheel, thereby executing substantially a square turn. While this type of maneuverability is highly desirable, present brake control systems often achieve it somewhat at the expense of ease and safety of operation of the vehicle in general. Usually each brake is controlled by a separate brake pedal, and an over-riding master pedal is provided to operate both brakes simultaneously. In some cases the relationship of pedals is such that the presence of one inhibits the most efficient and safest operation of another. Usually, provisions for a parking brake are either inadequate, or neglected completely.

It is an object of this invention to provide a brake control device for a vehicle having independent right side and left side brakes.

It is another object of this invention to provide a brake control device of the above type wherein the arrangement of the control pedals is such that all the pedals are readily operated by the ball of the foot.

It is another object of this invention to provide a brake control device of the above type wherein the danger of inadvertent actuation of the wrong brake control lever is reduced to the minimum consistent with practical operation.

It is another object of this invention to provide a brake control device of the above type including a parking brake feature which simply and easily locks all the wheel brakes for safe parking of the vehicle, even on hillsides.

It is another object of this invention to provide a brake control device of the above type which is mechanically simple, rugged, dependable and maintenance free in operation and capable of manufacture at low cost.

These and other objects and advantages of this invention will be apparent upon reference to the following description and claims taken in conjunction with the accompanying drawings wherein:

FIG. 1 is a sectional elevational view of the operator's platform of a self-propelled vehicle, such as a forage harvester, taken on the line 1—1 of FIG. 2;

FIG. 2 is a sectional view taken on the line 2—2 of FIG. 1 on a smaller scale;

FIG. 3 is a sectional view taken on the line 3—3 of FIG. 1 and drawn to a smaller scale; and FIG. 4 is a fragmentary sectional view taken on the line 4—4 of FIG. 1 and drawn to a reduced scale.

Referring to the drawings in detail, the reference numeral 10 indicates the operator's platform of a self-propelled farm implement, or other vehicle. The platform 10 is bordered by a downturned flange 11. A portion of a stanchion 12 is visible in FIGURES 1 and 2. The stanchion 12 is carried by platform 10 and conventionally serves to carry the vehicle steering wheel and various gages and control levers necessary to the operation of the vehicle. Depending from platform 10 are a pair of bearing, or journal, plates 14 and 15 (FIG. 2) which carry the ends of a short shaft 16. The shaft 16 extends transverse to the direction of vehicle travel which would be from right to left as the platform is shown in FIG. 1.

On shaft 16 under platform 10 is journaled the rearmost end of a left brake lever 18, a right brake lever 19 and a centrally located master brake lever 20. The left and right brake levers 18 and 19 have rearwardly projecting arms 21 and 22, respectively, which carry rods 24 and 25. The rods 24 and 25, respectively, operate conventional left side and right side wheel brakes as is well known in the art. Each of the brake levers 18 and 19 has an additional upstanding arm marked 26 and 28, respectively, to which springs 29 (FIG. 1) are connected. The other ends of the springs (not shown) are anchored to the vehicle frame to bias the brake levers upwardly, or clockwise, as seen in FIG. 1, to a raised brake release position. The brake levers are adapted to be swung downwardly, or counterclockwise (FIG. 1), about shaft 16 in opposition to return springs 29 to a brake actuating position. It will be apparent that downward swinging of levers 18 and 19 results in upward swinging of the respective arms 21 and 22 which actuates the respective left side and right side brakes via rods 24 and 25.

An upstanding arm 30 is rigidly mounted on the forward end of left brake lever 18. Arm 30 extends upwardly above the operator's platform 10 and has a foot pedal 31 rigidly mounted on its upper end. A similar arm 32 and pedal 34 are rigidly carried by the forward end of right brake lever 19. The arms 30 and 32 are parallel and of equal length whereby the left and right brake pedals 31 and 34 lie in a common plane when their respective brake levers are both in the raised brake release position.

The master brake lever 20 lies between levers 18 and 19 and operates in a vertical plane parallel to the planes of operation of the levers 18 and 19. A master brake arm 35 is mounted on lever 20 and carries a master brake pedal 36 at its upper end. As may be seen in FIG. 1, the master brake arm 35 is longer than the right and left brake arms whereby the master brake pedal 36 lies in a plane nearer the vehicle operator than the pedals 31 and 34 when the brake levers are in the brake release position.

A cross bar 38 extends transversely across all three brake levers 18, 19 and 20 as is best seen in FIG. 4. A pair of upstanding lugs 39 and 40 (FIG. 1) are welded, or otherwise rigidly provided, on master brake lever 20. The cross bar 38 extends between lugs 39 and 40 and has its center pivotally connected thereto by a nut and bolt 41. There is no fixed connection between the bar 38 and brake levers 18 and 19. Depression of the master brake lever 20 acts through the cross bar 38 to depress simultaneously and with equal force, the left and right brake levers 18 and 19. The return springs 29, which effect return of the left and right brake levers, also effect the return of master brake lever 20 via cross member 38.

In FIGS. 1 and 2 it may be seen that a series of ratchet-like teeth 42 are formed in the edge of master brake arm 35 adjacent the operator's platform 10. A locking pawl 43 is journaled at 44 in a pair of lugs 45 depending from the platform 10 adjacent master brake lever arm 35. The pawl 43 engages teeth 42 through a slot (not visible) in the front downturned flange of the operator's platform 10. In FIG. 1 it is best seen that the rearwardly extending end 46 of pawl 43 constitutes an overbalancing weight portion which normally biases pawl 43 clockwise about pivot 44 into engagement with the ratchet teeth 42 under the influence of gravity. When master brake lever 20 is actuated, engagement of pawl 43 with teeth 42 prevents return movement of master brake arm 35 (and thereby all the brake arms) as will be apparent in FIG. 1. The locking pawl is controlled by a crank 48 whose ends are journaled in the downturned flanges of the operator's platform and whose "throw" portion 49 operates as a cam on the underside of the weight portion 46 of pawl 43. A crank operating lever 50 is carried on one end of crank 48 and projects forwardly under the front flange of the operator's platform. A control rod 51 is connected to the front end of lever 50 and extends upwardly through the stanchion 12 to a position within easy reach of the vehicle operator. In FIG. 1 it will be apparent that a downward push on rod 51 will act through lever 50 to turn crank 48 counterclockwise. The "throw" portion 49 of crank 48 will first depress, or deflect, leaf spring 52, carried by pawl 43, solidly against the pawl and then solidly engage the underside of the weight portion 46 of pawl 43. This effects counterclockwise rotation of pawl 43 about pivot 44 and disengages the pawl from the teeth 42. When the rod 51 is pulled upwardly, the throw portion 49 of crank 48 moves downwardly away from the locking pawl and the overbalanced weight portion 46 effects locking engagement of the pawl with teeth 42.

The leaf spring 52 serves, in effect, to increase the throw of crank 48 after the pawl disengages from the teeth 42. The operator must move the rod 51 far enough to disengage pawl 43 from teeth 42. In so doing he has deflected spring 52 into solid engagement with the locking pawl. After the pawl disengages from teeth 42 the spring 52 returns to its normal position diverging from pawl 43 which causes the pawl to move further away from teeth 42. This insures sufficient clearance between the pawl and teeth that shocks and vibrations encountered during operation cannot effect accidental locking of the brakes. The spring also serves to dampen vibration of the pawl during operation of the vehicle and to facilitate less critical manufacturing tolerances on the locations of the various pivot centers and in the assembling of the various elements of the parking brake mechanism.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. A brake control device for a wheeled vehicle having a frame structure and first and second wheel brakes, said brake control device comprising a shaft mounted on said frame structure and extending transverse to the direction of travel of said vehicle, a pair of generally horizontal brake levers journalled on said shaft for vertical swinging movement between a raised brake release position and a lowered brake actuating position, means operatively connecting the first of said pair of levers to said first wheel brake, means operatively connecting the second of said pair of levers to said second wheel brake, a first arm mounted on said first lever and extending upwardly therefrom toward the operator of the vehicle, a second arm mounted on said second lever and extending upwardly therefrom toward the operator of the vehicle parallel to said first arm, a pair of brake pedals respectively mounted on the upper ends of said first and second arms, said pedals being spaced apart and lying in a common plane when said levers are in brake release position, a generally horizontal master brake lever journalled on said shaft between said first and second levers for vertical swinging movement between a raised release position and a lowered actuating position, said first and second levers and said master brake lever lying in substantially the same generally horizontal plane, a cross bar disposed above said levers and extending transversely across all three levers, means mounting said cross bar on said master brake lever for pivotal movement transverse to the axis of the master brake lever a fixed predetermined distance from said shaft whereby said cross bar engages with equal force and simultaneously actuates said first and second brake levers upon movement of said master brake lever from release position toward actuating position, a master brake arm mounted on said master brake lever and extending upwardly therefrom parallel to and between said first and second brake arms, said master brake arm extending farther above said brake levers than said first and second brake arms, a master brake pedal mounted on the upper end of said master brake arm whereby said master brake pedal is disposed closer to the operator of the vehicle than said pair of pedals, said master brake arm having a series of ratchet teeth formed therein, a locking pawl, pivot means mounting said locking pawl on said frame structure in position to engage said teeth and lock said master brake pedal in actuating position for parking said vehicle, and a manually operable control member mounted on said frame structure and engageable with said pawl to move and hold said pawl out of engagement with said ratchet teeth during operation of said vehicle.

2. A brake control device for a wheeled vehicle as recited in claim 1 wherein said locking pawl has end portions projecting on opposite sides of said pivot means, one of said end portions engaging said ratchet teeth and the other of said end portions comprising an overbalancing weight gravity biasing said one end portion into engagement with said teeth, a leaf spring mounted on the underside of said other of said end portions, said manually operable control member comprising a crank arm journalled on said frame structure and engageable with said leaf spring, a control rod operatively connected to said crank arm and projecting upwardly to within reach of an operator of the vehicle for oscillating said crank arm to depress said leaf spring against said other end portion of said pawl and disengage said pawl from said ratchet teeth whereupon said leaf spring maintains said one end portion of said pawl spaced from said ratchet teeth.

References Cited by the Examiner
UNITED STATES PATENTS

| | | | |
|---|---|---|---|
| 2,443,331 | 6/1948 | Stewart | 74—480 |
| 2,553,119 | 5/1951 | Sprick | 74—540 |
| 2,989,875 | 6/1961 | Torrance | 74—478 |

FRED C. MATTERN, Jr., *Primary Examiner.*

MILTON KAUFMAN, *Examiner.*

J. PUFFER, *Assistant Examiner.*